United States Patent Office 3,489,708
Patented Jan. 13, 1970

3,489,708
AQUEOUS ALKALI-SENSITIVE POLYMERIC BLENDS FOR THE PROTECTION OF FINISHED SURFACES
Robert A. Isaksen and Robert V. De Shay, East Longmeadow, Mass., assignors to Monsanto Company, St. Louis, Mo., a corporation of Delaware
No Drawing. Filed Mar. 7, 1967, Ser. No. 621,160
Int. Cl. C08f 45/34
U.S. Cl. 260—33.2        11 Claims

ABSTRACT OF THE DISCLOSURE

An interpolymer of a vinyl ester and an ethylenically unsaturated mono- or poly-carboxylic acid is blended with a polymeric plasticizer having a molecular weight in the range of from about 190 to about 365 and a structure corresponding to the general formula:

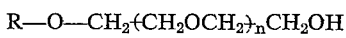

where R is a hydrogen or methyl radical. The blend has excellent impact properties and is useful for the protection of materials having at least one finished surface. When no longer needed, it may be removed from the substrate by washing with an aqueous alkaline solution.

BACKGROUND OF THE DISCLOSURE

Field of the invention

The present invention relates to polymeric organic coatings of increased flexibility and improved toughness over a relatively broad temperature range which may be used for the protection of various substrates and which may subsequently be removed by washing with an aqueous alkaline solvent.

Description of the prior art

The post-forming of prefinished sheets of various materials has become an important industrial process. In this process the product of one manufacturer is generally in the form of a sheet having at least one surface in a finished condition. The sheets are then transferred to another manufacturer who, by various mechanical means such as high pressure stamping, forms them into more useful shapes. Problems have arisen with regard to the protection of the finished surface of the sheet during this mechanically severe post-forming operation.

In another area, the use of prefinished materials in the building industry has become wide-spread in recent years. Problems have arisen, however, with regard to protecting the finished surfaces from the time they leave the factory until they are in place at the job site. In transit and during construction they are continually subjected to impact, abrasion, contamination of various kinds and the corrosive effects of weather, resulting in the need for expensive and time consuming repairs at the site or rejection of the workpiece as being unfit for use. The alleviation of these problems by the use of various types of protective coatings has been the subject of much research. Ordinary paints and varnishes are unsuitable, of course, because the stringent means which must be utilized to remove them would also attack and deface the underlying finished surface which was to be protected. Various "strippable" coatings—i.e., those which may, after application and drying, be peeled off the substrate easily in one continuous sheet—have also been proposed. Prohibitive costs have, however, limited their application. A more practicable solution has been the use of coatings which can be removed by washing. Ordinary water soluble polymers would, of course, be unsuitable since they could not withstand outdoor exposure in wet weather. Consequently, it has been necessary to provide coatings which are water insoluble as applied, but which may, by some simple treatment, be water-sensitized, i.e., made soluble or dispersible in water. Such a coating is disclosed in U.S. 3,063,873. Fundamentally, the resins involved are interpolymers in which at least one of the components is derived from a monomer having a carboxylic acid group. Film removal is then achieved by washing with aqueous alkali forming the water soluble salt of the acid. Widespread use of this type of coating has been hampered, however, by deficiencies in physical properties such as impact strength, tensile strength, abrasion resistance, etc., particularly under conditions of extreme outdoor temperatures or severe mechanical handling. In particular, these alkali soluble resins have exhibited a relatively sharp glass transition. This is to say, the change from tough flexible rubberiness to easily-shattered, brittle glassiness occurs over a relatively narrow temperature range. Addition of ordinary plasticizers does not serve to broaden this range but, rather, merely shifts the transition to a lower temperature. For the above mentioned applications, particularly the post-forming operations, a coating is needed in which the transition to the glassy state is as gradual as possible with decreasing temperature.

SUMMARY

According to the present invention, a water-insoluble interpolymer containing acid groups which tend to solubilize the interpolymer in the presence of aqueous alkaline solutions is blended with a polymer having the facility of lowering the glass transition temperature and concurrently broadening the temperature range over which the transition occurs. This second resin may be considered to be a polymeric plasticizer which adds strength and toughness to the blend and does not "bleed out" over a period of time. The polymeric plasticizer has a glass transition temperature which is lower than that of the interpolymer in the blend.

By "glass transition" is meant that temperature over which a soft rubbery polymer or interpolymer becomes glassy and brittle with decreasing temperature. Generally, as the temperature is raised above the glass transition temperature, resins become softer and softer, culminating in melts, if not decomposition. Concurrent with this softening of the polymer, a tendency toward increased tackiness arises. Unfortunately, a high degree of adhesiveness is detrimental to the ends sought to be achieved by the present invention in that it leads to a diminuation of the ease with which the coating can be removed from the substrate when no longer needed. It has been found, however, that the blend of the present invention exhibits not only the lowering of the transition temperature and broadening of the transition region referred to above but also serves to delay the onset of this softening process thereby rendering the material useful at increased as well as decreased temperatures.

More particularly, the present invention relates to an aqueous alkali soluble or dispersible coating composition and the method by which it may be used to protect the finished surface or surfaces of materials having at least one surface thereof in a finished condition; wherein the coating composition is comprised of a blend of:

(a) 80–95% by weight of an interpolymer comprising:

(1) about 0.5 mol percent to about 20 mol percent of an ethylenically unsaturated mono- or poly-carboxylic acid containing 3 to 6 carbon atoms, and correspondingly, (2) about 99.5 mol percent to about 80 mol percent of a vinyl ester of a saturated aliphatic acid, said saturated acid containing 1 to 6 carbon atoms;

and correspondingly, (b) 20–5% by weight of a polymer having a molecular weight in the range of about 190 to about 365 and a structure corresponding to the general formula:

$$R-O-CH_2(CH_2OCH_2)_nCH_2OH$$

where R is selected from the group consisting of hydrogen and methyl radicals.

If desired, about one part by weight of benzotriazole for every 100 parts by weight of the interpolymer blend may be added to the blend to enhance the adhesion of the coating to certain substrates.

The acid group-containing interpolymer may be prepared by any of the several well-known polymerization methods, such as emulsion, suspension, solution or bulk polymerization. When an emulsion is used, mixing may be carried out on it directly; for a suspension or bulk polymerized resin, it will usually be necessary to dissolve each component in a mutually satisfactory solvent system in order to facilitate proper blending. It is also essential, of course, that the polymeric plasticizer be at least partially compatible with the primary, acid group-containing, interpolymer of the system. Both from the point of view of increased toughness at room temperature and from the point of view of having flexibility and strength at low temperatures, it is advantageous to choose a polymeric plasticizer which will lower the glass transition temperature of the blend to the greatest possible extent, bearing in mind the prerequisite of compatibility. The resinous coatings of this invention will thus be useful in protecting a broad spectrum of substrates over a wide range of climatic and working conditions.

It is, therefore, an object of the present invention to provide coatings for the protection of a wide variety of materials having at least one finished surface.

It is a further object of this invention to provide coatings which may be fully removed from their substrates by washing with aqueous alkaline solutions.

It is a further object of this invention to provide coatings based upon polymeric blends having glass transition temperatures at or below room temperature and relatively broad transitional temperature ranges.

It is a further object of this invention to provide coatings which exhibit toughness, flexibility and resistance to manhandling over a broad temperature range.

DESCRIPTION OF THE PREFERRED EMBODIMENTS

The coating composition of this invention comprises a mixture of an organic interpolymer containing carboxylic acid groups with an organic polymer at least partially compatible with the interpolymer and capable of yielding a blend having a glass transition temperature at or below room temperature and a transition over a relatively broad temperature range. The determination of the temperature range over which this transition occurs may be carried out in a number of ways well-known in the art, e.g., it may be determined graphically by plotting the heat capacity of the polymer versus temperature. At the glass transition temperature of the unblended interpolymer a sharp change in the slope of the curve will be observed denoting a large, rapid change in heat capacity over a relatively narrow temperature range. By use of the composition of this invention, however, the slope of this part of the curve is substantially diminished, resulting in a transition having a breadth about 35–40% greater than that of the unblended interpolymer. What is observed, then, in practice, is a protective coating which not only has greater toughness at ordinary room temperatures, but also retains a greater degree of this toughness as this temperature is decreased or increased.

The acid group-containing interpolymer is comprised of an organic ethylenically unsaturated carboxylic acid in chemical combination with the vinyl ester of a saturated aliphatic acid. This interpolymer is limited to resins that are soluble in aqueous alkali. For ready solubility, it is necessary to use an interpolymer having at least 0.5 mol of unsaturated carboxylic acid for every 99.5 mols of the vinyl ester. It is preferable, for ease of solution, to limit the saturated organic acid forming the vinyl ester to one containing from 1 to 6 carbon atoms. Examples of these acids are formic, acetic, propanoic, butanoic, pentanoic, and hexanoic acids, their isomers, and mixtures thereof. For the same reason, the unsaturated acid in this interpolymer is limited to mono- or poly-carboxylic acids containing 3 to 6 carbon atoms. Examples of these acids are acrylic, methacrylic, crotonic, isocrotonic, 3-butenoic, angelic, tiglic, senecioic, hydrosorbic alpha-methylene butyric maleic, fumaric, glutaconic, etc. The upper limit of the concentration of the unsaturated acid is about 20 mol percent—above this the interpolymer becomes undesirably water sensitive. From the point of view of optimum adhesion, aqueous alkaline solubility, water insensitivity and convenient polymerization rate, an acid concentration ranging from 3 to 5 mol percent is preferred.

The polymeric plasticizer of this invention is a low molecular weight polymer of ethylene oxide having the general structural formula:

$$R-O-CH_2(CH_2OCH_2)_nCH_2OH$$

The molecular weight range of about 190 to about 365 is critical to the invention; it has been found that resins having this structural formula but molecular weights outside this range do not yield blends with the above described interpolymers which exhibit the desired resistance to impact.

The blended coating composition of this invention contains from 80 to 95 weight percent of the vinyl ester/ethylenically unsaturated carboxylic acid interpolymer and, correspondingly, from 20 to 5 weight percent of the above described polymeric plasticizer. If the ratio of the interpolymer to the polymeric plasticizer exceeds 95/5, the desired flexibility will not be achieved; if the ratio drops below 80/20 the material will be too soft to withstand severe mechanical handling. For the optimum combination of flexibility, toughness and controlled adhesion the preferred ranges are 90–95 weight percent carboxylic acid-containing vinyl ester and corresponding, 10–5 weight percent polymeric plasticizer.

The following examples are presented in illustration of the invention and are not intended as limitations thereof. Where parts are mentioned, parts by weight are intended unless otherwise described.

EXAMPLE I

Part A.—20 parts of an interpolymer containing 95 mol percent vinyl acetate and 5 mol percent crotonic acid is dissolved in 80 parts of 95% ethanol. To this is added 2.6 parts of triethylene glycol (molecular weight 150). The resulting solution is applied to a polished mild steel test panel and allowed to dry at room temperature. It is then baked in an oven at 500° F. for 1 minute. The resulting film is then subjected to an 80 in./lb. reverse impact test on a Gardner Impact Tester. It is found to be a total failure, in that it cracks and chips away from the substrate, causing it to be exposed.

Part B.—20 parts of an interpolymer containing 95 mol percent vinyl acetate and 5 mol percent crotonic acid is dissolved in 80 parts of 95% ethanol. To this is added 2.6 parts of polyethylene glycol having a molecular weight in the range of 380–420. The resulting solution is applied to a polished mild steel test panel and allowed to dry at room temperature. The panel is then baked in an oven at 500° F. for 1 minute. The resulting film crazes badly when subjected to a reverse impact of 60 in./lbs.

Part C.—20 parts of an interpolymer containing 95 mol percent vinyl acetate and 5 mol percent crotonic acid is dissolved in 80 parts of 95% ethanol. To this is added 2.6 parts of polypropylene glycol. The resulting solution is applied to polished mild steel test panels and allowed to dry at room temperature. The panels are then baked in an oven at 500° F. for 1 minute. The resulting film when subjected to a reverse impact of 80 in./lbs. is a total failure, cracking and chipping away from the metal substrate.

Part D.—20 parts of an interpolymer containing 95 mol percent vinyl acetate and 5 mol percent crotonic acid is dissolved in 80 parts of 95% ethanol. To this is added 2.6 parts of polyethylene glycol having a molecular weight in the range 190–210. The resulting solution is applied to polished mild steel test panels. The film is allowed to dry at room temperature and is then baked in an oven at 500° F. for 1 minute. The resulting dry film is able to withstand a reverse impact of 160 in./lbs. with no cracking, chipping or crazing whatsoever. The film is completely removed from the substrate by soaking for 3 minutes in water containing 2% anionic detergent and enough sodium hydroxide to adjust the pH to pH 11. The temperature of the wash solution is 175° F.

The above example clearly demonstrates that where a coating is prepared according to the teaching of this invention it is removable from its substrate by washing with aqueous alkaline solution and exhibits a marked improvement in strength and toughness as measured by impact strength compared with coatings prepared using ethylene oxide polymers having molecular weights below the claimed range (Part A), above the claimed range (Part B), and those based on higher alkaline oxides (Part C).

EXAMPLE II

Example I, Part D is repeated with the polyethylene glycol being present at levels of 5, 10 and 15%. Test panels of aluminum, steel and stainless steel are used. In all cases the films withstand the 160 in./lb. reverse impact test and are removable from the substrates by the aqueous alkaline wash.

EXAMPLE III

Part A.—The glass transition of the vinyl acetate/crotonic acid interpolymer of Example I was measured by differential thermal analysis. The glass transition temperature was found to be 36° C. and the glass transition region extended over a breadth of eleven centigrade degrees.

Part B.—90 parts of an interpolymer containing 95 mol percent vinyl acetate and 5 mol percent crotonic acid is blended with 10 parts of a polyethylene glycol having a molecular weight in the range of from about 190 to about 210. By differential thermal analysis, the glass transition temperature was found to be 11° C. and the glass transition region extended over a breadth of 15 centigrade degrees.

Part C.—Part B was repeated using 80 parts of the interpolymer and 20 parts of the polymeric plasticizer. The glass transition temperature was −7° C. and the breadth of the region was fifteen centigrade degrees.

Examples I–III illustrate the most preferred embodiments of the present invention. The following examples, IV and V, further illustrate the scope contemplated.

EXAMPLE IV 95 parts of an interpolymer containing 99.5 mol percent vinyl acetate and 0.5 mol percent maleic acid is dissolved in 400 parts of 95% ethanol. To this is added 5 parts of polyethylene glycol having a molecular weight in the range of 285–315. The solution is applied to a mild steel test panel and permitted to dry. The resulting film has a high impact strength and is readily removable by the aqueous alkaline wash.

EXAMPLE V 80 parts of an interpolymer containing 80 mol percent vinyl butyrate and 20 mol percent acrylic acid is dissolved in 400 parts of 95% ethanol. To this is added 20 parts of methoxypolyethylene glycol having a molecular weight in the range of 335–365. The above procedure is repeated with equivalent results.

It is obvious, of course, that various additives such as pigments, dyes, fillers, extenders, wetting agents and the like may be added to these compositions without departing from the scope of this invention. Small quantities of a conventional drier such as naphthenate of lead, cobalt or manganese, etc., may be employed, if desired, to improve the drying characteristics of films cast from these resins. The films may be employed to protect the finished surfaces of such commercial products as automobiles, appliances, furniture, architectural structures, etc., as well as non-fabricated materials such as sheets, tubes, rods, etc.

Films of the blends of this invention will adhere to most surfaces, including glass, wood, masonry, plaster, textiles, other resins, asphaltous matrices, etc., in addition to metals. They possess an unusually attractive balance between the properties of flexibility and hardness, in addition to being resistant to impact.

Applications of the coatings may be accomplished by conventional methods; e.g., brushing, spraying, dipping, etc.

It is obvious that many variations may be made in the products and methods set forth above without departing from the spirit and scope of this invention.

We claim:

1. A coating composition sensitive to aqueous alkaline solutions comprising a blend of:
    (a) 80–95% by weight of an interpolymer comprising:
        (1) about 0.5 mol percent to about 20 mol percent of an ethylenically unsaturated mono- or poly-carboxylic acid containing 3–6 carbon atoms and, correspondingly,
        (2) about 99.5 mol percent to about 80 mol percent of a vinyl ester of a saturated aliphatic acid, said saturated acid containing 1–6 carbon atoms;
    and correspondingly,
    (b) 20–5% by weight of a polymer having a molecular weight in the range of about 190 to about 365 and a structure corresponding to the general formula:

where R is selected from the group consisting of hydrogen and methyl radicals.

2. The coating composition of claim 1 wherein the ethylenically unsaturated acid of the interpolymer is crotonic acid and the vinyl ester of a saturated aliphatic acid in the interpolymer is vinyl acetate.

3. The coating composition of claim 1 further containing about 1 part by weight of benzotriazole for every 100 parts by weight of the blend.

4. A method of protecting finished surfaces which comprises applying thereto a coating composition sensitive to aqueous alkaline solutions comprising a blend of:
    (a) 80–95% by weight of an interpolymer comprising:
        (1) about 0.5 mol percent to about 20 mol percent of an ethylenically unsaturated mono- or poly-carboxylic acid containing 3–6 carbon atoms and, correspondingly,
        (2) about 99.5 mol percent to about 80 mol percent of a vinyl ester of a saturated aliphatic acid, said saturated acid containing 1 to 6 carbon atoms;
    and correspondingly,
    (b) 20–5% by weight of a polymer having a molecular weight in the range of about 190 to about 365 and a structure corresponding to the general formula:

where R is selected from the group consisting of hydrogen and methyl radicals.

5. The method of claim 4 wherein the ethylenically unsaturated acid in the interpolymer is crotonic acid and the vinyl ester of a saturated aliphatic acid in the interpolymer is vinyl acetate.

6. The method of claim 5 wherein the coating composition further contains about 1 part by weight of benzotriazole for every 100 parts by weight of the blend.

7. A coating composition sensitive to aqueous alkaline solutions comprising a blend of:
   (a) 90–95% by weight of an interpolymer comprising:
      (1) about 3 mol percent to about 5 mol percent crontic acid, and correspondingly,
      (2) about 97 mol percent to about 95 mol percent vinyl acetate;
   and correspondingly,
   (b) 10–5% by weight of a polymer having a molecular weight in the range of about 190 to about 365 and a structure corresponding to the general formula:

R—O—CH$_2$(CH$_2$OCH$_2$)$_n$CH$_2$OH where R is selected from the group consisting of hydrogen and methyl radicals.

8. A method of protecting finished surfaces which comprises applying thereto a coating composition sensitive to aqueous alkaline solutions comprising a blend of:
   (a) 90–95% by weight of an interpolymer comprising:
      (1) about 3 mol percent to about 5 mol percent crotonic acid, and correspondingly,
      (2) about 97 mol percent to about 95 mol percent vinyl acetate;
   and correspondingly,
   (b) 10–5% by weight of a polymer having a molecular weight in the range of about 190 to about 365 and a structure corresponding to the general formula:

R—O—CH$_2$(CH$_2$OCH$_2$)$_n$CH$_2$OH where R is selected from the group consisting of hydrogen and methyl radicals.

9. A finished surface having coated thereon a film sensitive to aqueous alkaline solutions comprising a blend of:
   (a) 80–95% by weight of an interpolymer comprising:
      (1) about 0.5 mol percent to about 20 mol percent of an ethylenically unsaturated mono- or polycarboxylic acid containing 3–6 carbon atoms and, correspondingly,
      (2) about 99.5 mol percent to about 80 mol percent of a vinyl ester of a saturated aliphatic acid, said saturated acid containing 1–6 carbon atoms;
   and correspondingly,
   (b) 20–5% by weight of a polymer having a molecular weight in the range of about 190 to about 365 and a structure corresponding to the general formula:

R—O—CH$_2$(CH$_2$OCH$_2$)$_n$CH$_2$OH where R is selected from the group consisting of hydrogen and methyl radicals.

10. The surface of claim 7 wherein, in the film, the ethylenically unsaturated acid of the interpolymer is crotonic acid and the vinyl ester of a saturated aliphatic acid in the interpolymer is vinyl acetate.

11. The surface of claim 7 wherein the film further contains about 1 part by weight of benzotriazole for every 100 parts by weight of the blend.

References Cited

UNITED STATES PATENTS

| | | | |
|---|---|---|---|
| 3,245,936 | 4/1966 | Corey et al. | 260—85.7 |
| 3,352,806 | 11/1967 | Hicks | 260—85.7 |
| 3,361,702 | 1/1968 | Wartman et al. | 260—33.2 |

OTHER REFERENCES

"Carbowax Polyethylene Glycols"—technical bulletin by Union Carbide Chemicals Co. (1960), p. 3.

MORRIS LIEBMAN, Primary Examiner

H. H. FLETCHER, Assistant Examiner

U.S. Cl. X.R.

117—124, 128.4, 132, 138.5, 161; 260—33.4, 85.7, 29.6